United States Patent
Chen et al.

(10) Patent No.: US 8,279,361 B2
(45) Date of Patent: Oct. 2, 2012

(54) TOUCH-SENSITIVE LIQUID CRYSTAL DISPLAY DEVICE

(75) Inventors: Hsin-Li Chen, Miao-Li County (TW); Wen-Hsiung Liu, Miao-Li County (TW)

(73) Assignee: Chimei InnoLux Corporation, Miaoli County (TW)

( * ) Notice: Subject to any disclaimer, the term of this patent is extended or adjusted under 35 U.S.C. 154(b) by 125 days.

(21) Appl. No.: 12/844,803

(22) Filed: Jul. 27, 2010

(65) Prior Publication Data
US 2011/0025969 A1 Feb. 3, 2011

(30) Foreign Application Priority Data
Jul. 31, 2009 (CN) .......................... 2009 1 0305086

(51) Int. Cl.
*G02F 1/1335* (2006.01)
(52) U.S. Cl. ......................................................... 349/12
(58) Field of Classification Search ...................... 349/12
See application file for complete search history.

(56) References Cited

U.S. PATENT DOCUMENTS

| 4,550,221 A | 10/1985 | Mabusth |
| 2008/0136980 A1 | 6/2008 | Rho et al. |
| 2008/0186288 A1 * | 8/2008 | Chang ........................... 345/174 |

FOREIGN PATENT DOCUMENTS

CN 101196652 A 6/2008

* cited by examiner

*Primary Examiner* — Phu Vu
(74) *Attorney, Agent, or Firm* — Li & Cai Intellectual Property (USA) Office

(57) ABSTRACT

A in-cell touch-sensitive liquid crystal display device (LCD) includes a first substrate, a second substrate opposite to the first substrate, a liquid crystal layer disposed between the first substrate and the second substrate, a first sensing line and a second sensing line disposed on the second substrate, a first conductive layer and a second conductive layer electrically connected to the first sensing line and the second sensing line, respectively, and electrically isolated from each other by a gap existing therebetween. The in-cell touch-sensitive LCD device further includes a spacer disposed on the first substrate and corresponding to the gap. The spacer is electrically connected to the first conductive layer and the second conductive layer in response to an external pressure.

20 Claims, 6 Drawing Sheets

TOUCH-SENSITIVE LIQUID CRYSTAL DISPLAY DEVICE

BACKGROUND OF THE DISCLOSURE

1. Field of the Disclosure

The present disclosure relates to a touch-sensitive liquid crystal display (LCD) device, and particularly relates to a in-cell touch-sensitive LCD device.

2. Description of Related Art

In a variety of consumer electronics products such as personal digital assistant (PDA), mobile phone, palm-sized PC, global positioning address(GPA) and information appliance, the touch panels disposed on the display planes have been introduced as input devices in replacement of conventional keyboards or mice, so that the user can use a finger or a stylus to perform an interactive input operation according to the picture or the scripts. The touch-sensitive type panels have gradually become one of the key components due to the advantages of the requirements of light weight, thinness, shortness, and smallness on product design, improving the man-machine interface friendly, and increasing the input operation effect.

Referring to FIG. 1, herein, FIG. 1 is a cross-sectional view illustrating a conventional touch-sensitive LCD device. The conventional touch-sensitive LCD device includes a LCD panel 110 and a touch-sensitive panel 120, wherein the sensing method of the touch-sensitive panel 120 includes resistance type, capacitance type, electromagnetism type, acoustic-wave type or infrared rays type. As shown in FIG. 1, the touch panel 120 includes a upper substrate 122, a lower substrate 124 and transparent conductive layers 126, 128 respectively formed in the opposite surfaces of the upper substrate 122 and the lower substrate 124, and a spacer 130 is further disposed on the transparent conductive layer 128 disposed on the lower substrate 124 for supporting. When the upper substrate 122 of touch panel 120 is pressed by an external pressure, the upper substrate 122 generates a partially bending deformation so that the transparent conductive layer 126 disposed on the upper substrate 122 is electrically connected to the transparent conductive layer 128 disposed on the lower substrate 124, thereby a signal is generated and transmitted to the reading circuit externally connected thereto for determining the touch-sensing positions.

Those skilled in the art of the present disclosure should know that after the LCD panel 110 and the touch-sensitive panel 120 are formed respectively, as shown in FIG. 1, an adhesive layer is used to stack and adhere the LCD panel 110 and the touch-sensitive panel 120. The existence of all of the layers include the upper substrate 122, the lower substrate 124, the transparent conductive layers 126, 128 and so forth of the touch-sensitive panel 120 and the adhesive layer 102 increase the overall thickness and weight of the touch-sensitive LCD device 100. Furthermore, since the materials and the structures of the touch-sensitive panel 120 are limited, the thickness of the overall touch-sensitive LCD device 100 is hard to reduce. In addition, touch-sensitive panel 120 and the adhesive layer 102 further reduce the light transmittance rate of the touch-sensitive LCD device 100. Namely, the display effect of the touch-sensitive LCD device 100 is reduced.

SUMMARY OF THE DISCLOSURE

In view of the foregoing, the present disclosure is directed to an in-cell touch-sensitive LCD device accord with the lightness and slimness tendency of products and the requirement of superior display effect.

According to the claims of the present disclosure, a embodiment of the present disclosure discloses a in-cell touch-sensitive LCD device, which includes a first substrate, a second substrate opposite to the first substrate, a liquid crystal layer disposed between the first substrate and the second substrate, a first sensing line and a second sensing line disposed on the surface of the second substrate near the liquid crystal layer, a first conductive layer and a second conductive layer electrically connected to the first sensing line and the second sensing line, respectively, and electrically isolated from each other by a gap existing therebetween. The in-cell touch-sensitive LCD device further includes a spacer disposed on the first substrate and corresponding to the gap. The spacer is electrically connected to the first conductive layer and the second conductive layer in response to an external pressure.

According to the in-cell touch-sensitive LCD device provided in the present disclosure, the spacer is electrically connected to the first conductive layer and the second conductive layer which are electrically isolated from each other by the gap existing therebetween, originally, so that the touch-sensitive signal can be transmitted from the first sensing line to the second sensing line via the first conductive layer, the spacer and the second conductive, and then the touch-sensitive signal can be transmitted to the reading circuit to determine the touch-sensing positions by the reading circuit externally connected thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
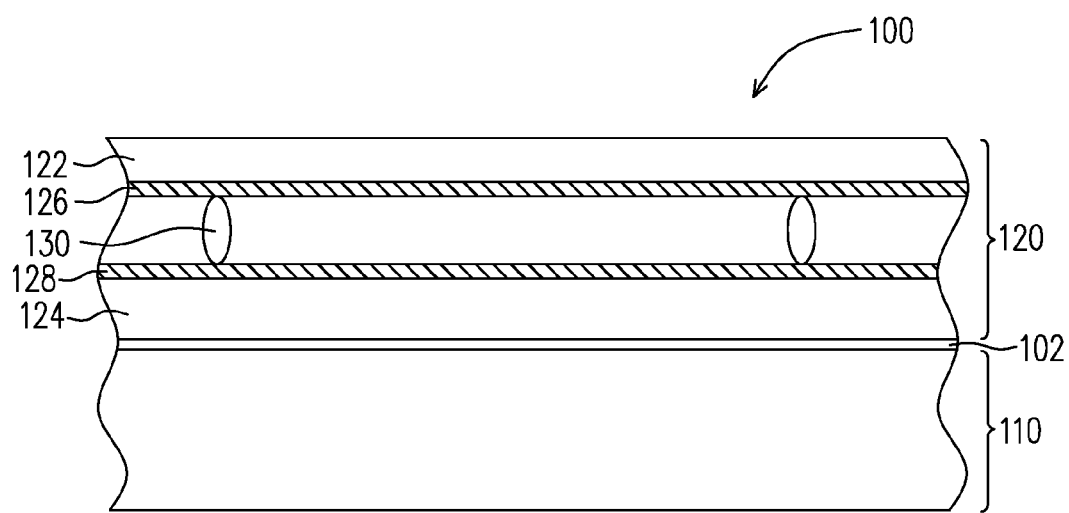
FIG. 1 is a cross-sectional view illustrating a conventional touch-sensitive LCD device.
Figure 2:
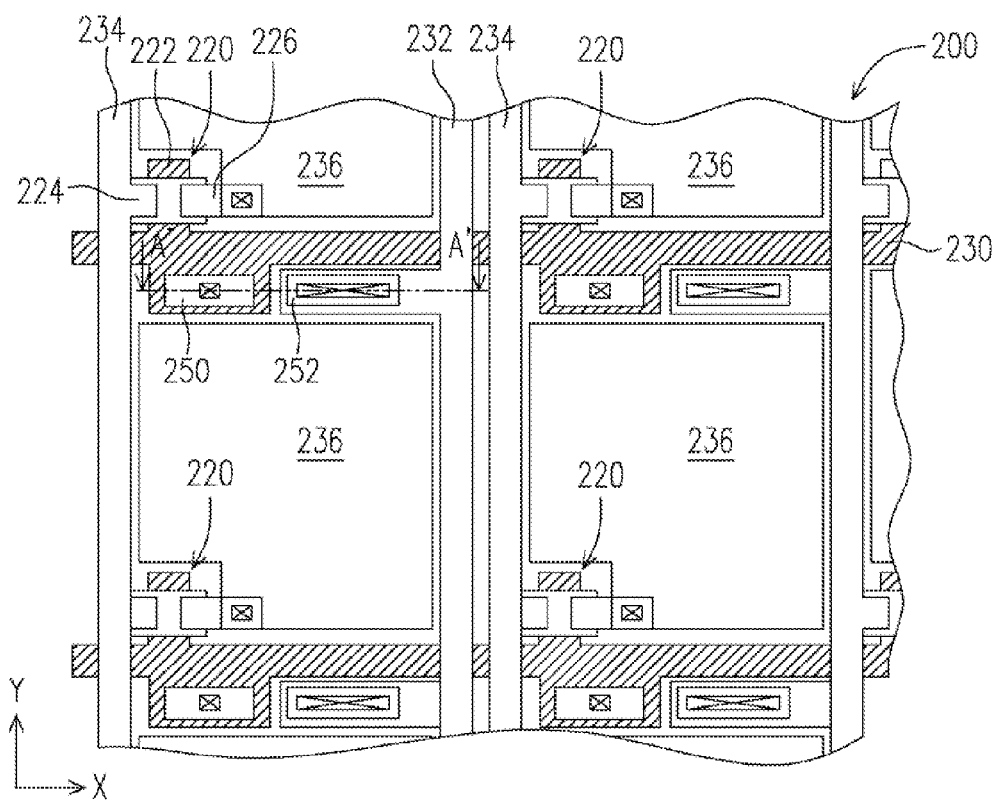
FIG. 2 is a schematic view of a touch-sensitive LCD device according to a specific embodiment of the present disclosure.
Figure 3:
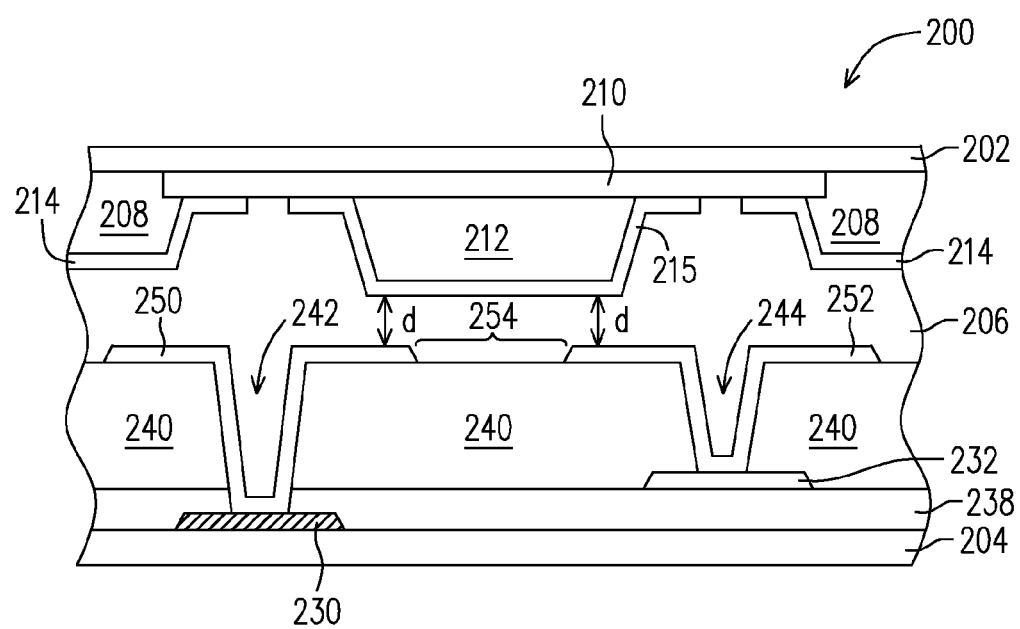
FIG. 3 is schematic cross-sectional views of a in-cell touch-sensitive LCD device in FIG. 2 taken along a lines A-A'.
Figure 4:
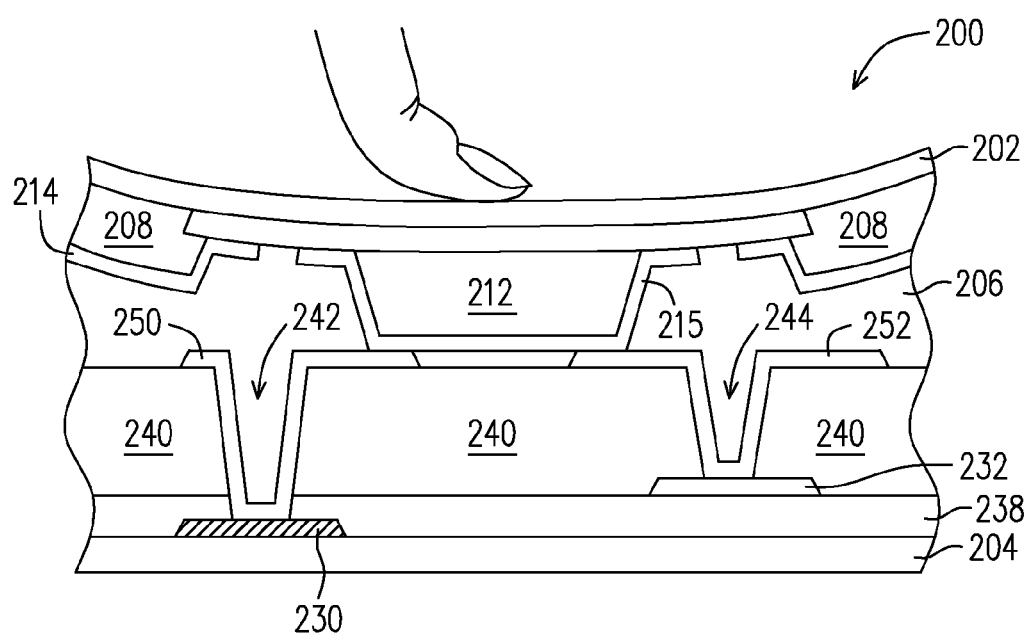
FIG. 4 is schematic view of operating state of the in-cell touch-sensitive LCD device in FIG. 3.
Figure 5:
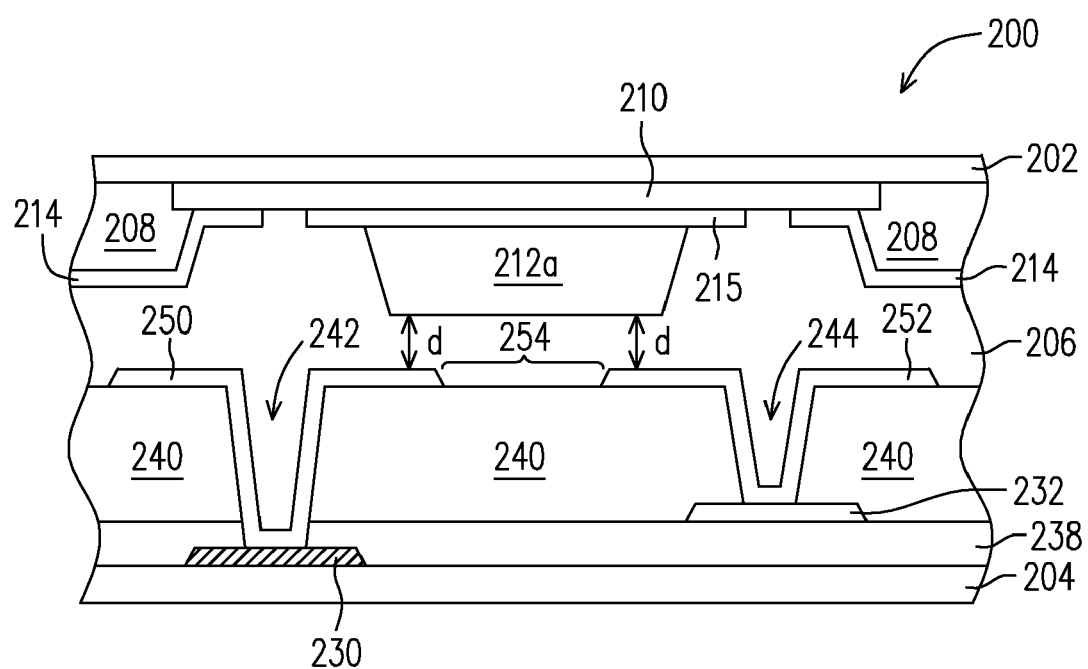
FIG. 5 illustrates a different variation of the in-cell touch-sensitive LCD device in the specific embodiment of the present disclosure.

Referring to FIGS. 2-5, herein FIG. 2 is a schematic view of a in-cell touch-sensitive LCD device according to a specific embodiment of the present disclosure; FIG. 3 is schematic cross-sectional views of a in-cell touch-sensitive LCD device in FIG. 2 taken along a lines A-A'; FIG. 4 is schematic view of operating state of the in-cell touch-sensitive LCD device in FIG. 3; and FIG. 5 illustrates a different variation of the in-cell touch-sensitive LCD device in the specific embodiment of the present disclosure.

First, referring to FIG. 3, a in-cell touch-sensitive LCD device 200 provided in the present embodiment includes a first substrate 202, a second substrate 204 opposite to the first substrate 202, a liquid crystal layer 206 disposed between the first substrate 202 and the second substrate 204. The first substrate 202 is a transparent and flexible substrate, and a color filter layer 208, a light-shielding layer 210 such as a black matrix, a overcoat passivation layer (not shown in the figure) selectively, a spacer 212, a common electrode 214 and a third conductive layer 215 are disposed on a surface of the first substrate 202 near the liquid crystal layer 206. The third conductive layer 215 and the common electrode 214 can be formed at the same time and made of the same conductive material, but electrically isolated from each other.

The color filter layer 208 generally includes red, green, blue and so forth for realizing the different color display. The common electrode 214 includes a transparent conductive material, such as indium tin oxide (ITO) or indium zinc oxide (IZO), for example. The common electrode 214, as shown in FIG. 3, covers each layer disposed on the first substrate 202, such as the light-shielding layer 210 and the color filter layer 208, and the common electrode 214 contacts with the liquid crystal layer 206. The spacer 212 in the present disclosure is a photo spacer. Thereby, the third conductive layer 215 covers the spacer 212. Namely, the third conductive layer 215 is disposed between the spacer 212 and the liquid crystal layer 206. In addition, the spacer 212 is not limited in a conductive spacer. When the spacer 212 is a conductive spacer, as shown in FIG. 5, the conductive spacer 212a is disposed between the third conductive layer 215 and the liquid crystal layer 206.

Next, referring to both FIG. 2 and FIG. 3. A plurality of thin film transistors (TFTs) 220, a plurality of sensing lines 230, a plurality of second sensing lines 232, a plurality of data lines 234 and a plurality pixel electrodes 236 are disposed on the second substrate 204. Each TFT 220 further includes a gate 222, a source 224 and a drain 226. The sources 224 of the TFTs 220 are electrically connected to the corresponding data lines 234, and the drains 226 are electrically connected to the corresponding pixel electrodes 236. It is noted that, in a present embodiment, the first sensing lines 230 are scan lines, and the scan lines/first sensing lines 230 are electrically connected to the corresponding gate 222, and the scan lines /first sensing lines 230 and the gate 222 are formed in the same fabrication process. Thereby, the scan lines/first sensing lines 230 and the gate 222 are made of the same conductive material and co-planar.

The second sensing lines 232, the data lines 234, the sources 224 and the drains 226 are formed in the same fabrication process. Therefore, the sources 224, the drains 226, the second sensing lines 232 and the data lines 234 are made of the same conductive material and co-planar. Because the fabrication steps are well known to those skilled in the art therefore will not be described herein. Furthermore, as shown in FIG. 2, the data lines 234 are parallel to and electrically isolated from the second sensing lines 232. The data lines 234 are vertically disposed and interlaced with the scan lines/first sensing lines 230. Therefore, the first sensing lines 230 are perpendicular to and interlaced with the second sensing lines 232.

As mentioned above, since the first sensing lines 230 and the gate 222 are formed at the same time, and the second sensing lines 232, the data lines 234, the sources 224 and the drains 226 are formed at the same time, the first sensing lines 230 and the second sensing lines 232 are electrically isolated from each other by an insulating layer 238 disposed therebetween. Namely, the first sensing lines 230 and the second sensing lines 232 are disposed on different planes.

Next, referring to FIG. 3, a single sensing unit is taken as examples. An over coating layer 240 is disposed on the second substrate 204, and the over coating layer 240 includes a opening 242 corresponding to the first sensing line 230 and a opening 244 corresponding to the second sensing lines 232. The second substrate 204 further includes a first conductive layer 250 and a second conductive layer 252. Herein, the first conducive layer 250 and the second conductive layer 252 can be formed with the pixel electrodes 236 at the same fabrication process. Therefore, the first conducive layer 250, the second conductive layer 252 and the pixel electrodes 236 are made of the same transparent conductive material, such as ITO or IZO, for example.

The first conductive layer 250 is electrically connected to the first sensing lines 230 by the opening 242, and the second conducive layer 252 is electrically connected to the second sensing lines 232 by the opening 244. It should be noted that the first conductive layer 250 and the second conductive layer 252, as shown in FIG. 3, are electrically isolated from each other by a gap 254 existing therebetween, and the spacer 212 disposed on the first substrate 202 is corresponding to the gap 254. A thickness of the spacer 212 is less than a distance from the third conductive layer 215 to the first conductive layer 250 and the second conductive layer 252. Namely, a gap d exists between a bottom of the third conductive layer 215 covering the spacer 212 and tops of the first conductive layer 250 and the second conductive layer 252 in the state without external force.

Referring to FIG. 4. The gap d between the spacer 212 and the first conductive layer 250 and the second conductive layer 252 will be disappeared while a external force is exerted on the first substrate 202 and the flexible first substrate 202 generates a partially downward reversible deformation due to the external force. In other words, the third conductive layer 215 is electrically connected to the first conductive layer 250 and the second conductive layer 252 by the spacer 212 in response to the external pressures, as shown in FIG. 4.

Figure 6:
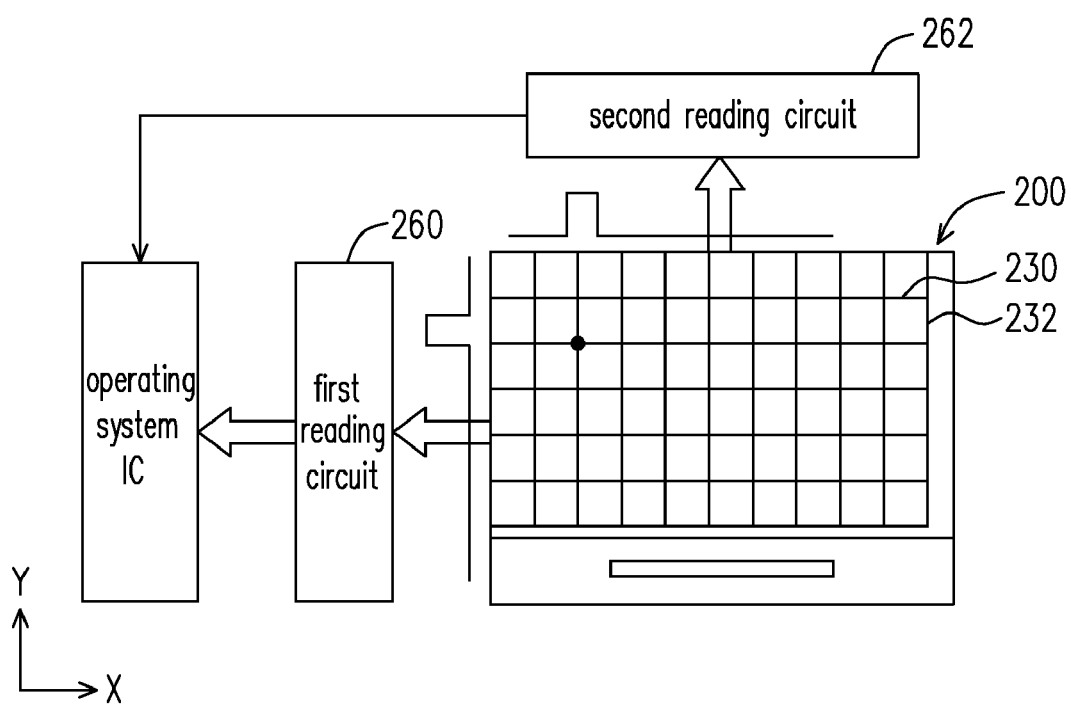
FIG. 6 is a view showing the operation principle of the in-cell touch-sensitive LCD device in the specific embodiment of the present disclosure.

Next, referring to both FIG. 4 and FIG. 6, herein, FIG. 6 is a view showing the operation principle of the in-cell touch-sensitive LCD device in the specific embodiment of the present disclosure. As shown in FIG. 6, each second sensing lines 232 is electrically connected to a second reading circuit 262, and each first sensing lines 230 can be electrically connected to a first reading circuit 260, alternatively. As mentioned above, the first sensing lines 230 in the specific embodiment are the scan lines of the touch-sensitive LCD device. Therefore, each first sensing line 230 is electrically connected to a gate driving circuit (not shown in the figure) and obtains a turn-on voltage in order by the gate driving circuit.

When the external pressure as shown in FIG. 4 is exerted on the first substrate 202 to make the first conductive layer 250, the third conductive layer 215 covering the spacer 212 and the second conductive layer 252 electrically connected to one another, the turn-on voltage of the first sensing lines 230 obtained form the gate driving circuit will be transmitted to the second sensing lines 232 by the first conductive layer 250, the third conductive layer 215 covering the spacer 212 and the second sensing lines 232, and then the turn-on voltage is transmitted to the second reading circuit 262 to generate the X-direction touch-sensitive signal.

On the other hand, each first sensing line 230 disposed in parallel to the X-direction and each second sensing line 232 disposed in parallel to the Y-direction are allocated in couples and in an interlacing manner with respect to each other to define a sub-pixel unit, and the scan lines scan each rows sequentially. Therefore, when the second reading circuit 262 obtains the X-direction touch-sensitive signal, it can get to know which one of the first sensing line 230 and which one of the second sensing lines 232 are electrically connected to each other according to the timing of receiving signal to make voltage transmit to the second reading circuit 262 from the second sensing lines 232, and then the Y-direction touch-sensitive signal can be obtained. However, since the above-mentioned method for determining is obtained according to different signal decoding circuit designs, and the present disclosure is not limited thereto.

According to the in-cell touch-sensitive LCD device provided in the present disclosure, the spacer itself or the third conductive layer covering the spacer is electrically connected to the first conductive layer and the second conductive layer which are electrically isolated from each other by the gap existing therebetween, originally, so that the touch-sensitive signal can be transmitted from the first sensing lines to the second sensing lines via the first conductive layer, the third conductive layer covering the spacer and the second conductive layer, and then the touch-sensitive signal can be transmitted to the reading circuit to determine the touch-sensing positions by the reading circuit externally connected thereto. The in-cell touch-sensitive LCD device provided in the present disclosure can not only be employed the TFT substrate, but also can be employed the color filter on array (COA). Furthermore, the in-cell touch-sensitive LCD provided in the present disclosure can attain the function of in-cell touch-sensitive LCD device by using the spacer and the first conductive layer and the second conductive layer. Namely, the present disclosure achieves the purpose which is integrated the touch panel and the display panel not only can reduce a thickness of the LCD device, but also can not loss of the brightness of the LCD device.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. An in-cell touch-sensitive liquid crystal display (LCD) device, comprising:
    a first substrate comprising a common electrode and a third conductive layer, the common electrode electrically isolated from the third conductive layer, and the third conductive layer and the common electrode made of the same conductive material;
    a second substrate opposite to the first substrate;
    a liquid crystal layer disposed between the first substrate and the second substrate;
    a first sensing line and a second sensing line disposed on a surface of the second substrate near the liquid crystal layer;
    a first conductive layer and a second conductive layer electrically connected to the first sensing line and the second sensing line, respectively, and the first conductive layer and the second conductive layer electrically isolated from each other by a gap existing therebetween; and
    a spacer disposed on the first substrate and corresponding to the gap.

2. The in-cell touch-sensitive LCD device as claimed in claim 1, wherein the first sensing line serves as a scan line, and the first sensing line is perpendicular to the second sensing line.

3. The in-cell touch-sensitive LCD device as claimed in claim 2, wherein the second substrate further comprises a data line, and the data line is parallel to and electrically isolated from the second sensing line.

4. The in-cell touch-sensitive LCD device as claimed in claim 3, wherein the data line and the second sensing line are made of the same conductive material and co-planar.

5. The in-cell touch-sensitive LCD device as claimed in claim 1, wherein the second substrate further comprises a pixel electrode, and the pixel electrode, the first conductive layer and the second conductive layer are made of the same conductive material.

6. The in-cell touch-sensitive LCD device as claimed in claim 1, further comprising a reading circuit, electrically connected to the second sensing line.

7. The in-cell touch-sensitive LCD device as claimed in claim 1, wherein the spacer is a conductive spacer, the third conductive layer and the common electrode are co-planar, and the third conductive layer is disposed between the conductive spacer and the liquid crystal layer.

8. The in-cell touch-sensitive LCD device as claimed in claim 1, wherein the spacer is a photo spacer, and the third conductive layer is disposed between the photo spacer and the liquid crystal layer.

9. The in-cell touch-sensitive LCD device as claimed in claim 8, wherein a height of the photo spacer is less than a distance from the third conductive layer to the first conductive layer and the second conductive layer.

10. The in-cell touch-sensitive LCD device as claimed in claim 9, wherein the photo spacer moves toward the second substrate in response to an external pressure so as to make the third conductive layer electrically connected to the first conductive layer and the second conductive layer.

11. The in-cell touch-sensitive LCD device as claimed in claim 3, wherein the second substrate further comprises a thin film transistor (TFT) and a pixel electrode, a gate of the TFT is connected to the first sensing line, a source of the TFT is connected to the data line, and a drain of the TFT is conncted to the pixel electrode.

12. An in-cell touch-sensitive liquid crystal display (LCD) device, comprising:
    a first substrate;
    a second substrate opposite to the first substrate;
    a liquid crystal layer disposed between the first substrate and the second substrate;
    a plurality of first sensing lines and a plurality of second sensing lines perpendicular to the first sensing lines, the first and second sensing lines disposed on a surface of the second substrate near the liquid crystal layer, the first sensing lines serving as scan lines, the first sensing lines and the second sensing lines defining a plurality of sub-pixel units, each sub-pixel unit comprising a first conductive layer, a second conductive layer and a thin film transistor (TFT), the first conductive layer and TFT both electrically connected to a corresponding one of the first sensing lines, the second conductive layer electrically connected to a corresponding one of the second sensing lines, and the first conductive layer and the second conductive layer electrically isolated from each other by a gap existing therebetween; and
    a spacer disposed on the first substrate and corresponding to the gap.

13. The in-cell touch-sensitive LCD device as claimed in claim 12, wherein the second substrate further comprises a plurality of data lines parallel to the second sensing lines, each sub-pixel unit further comprises a pixel electrode, a gate of the TFT is connected to the corresponding one of the first sensing lines, a source of the TFT is connected to a corresponding one of the data lines, and a drain of the TFT is connected to the pixel electrode of each sub-pixel unit.

14. The in-cell touch-sensitive LCD device as claimed in claim 13, wherein the first substrate comprises a common electrode and a third conductive layer, the common electrode is electrically isolated from the third conductive layer, the third conductive layer and the common electrode are co-planar, and the third conductive layer is disposed between the spacer and the liquid crystal layer.

15. The in-cell touch-sensitive LCD device as claimed in claim 14, wherein the first conductive layer and the TFT are electrically connected to the corresponding one of the first sensing lines at two opposite sides of the corresponding first sensing line.

16. The in-cell touch-sensitive LCD device as claimed in claim 14, wherein the third conductive layer and the common electrode are made of the same conductive material.

17. The in-cell touch-sensitive LCD device as claimed in claim 12, wherein the data lines and the second sensing lines are made of the same conductive material and co-planar.

18. The in-cell touch-sensitive LCD device as claimed in claim 12, wherein the pixel electrode of each sub-pixel unit, the first conductive layer and the second conductive layer are made of the same conductive material.

19. An in-cell touch-sensitive liquid crystal display (LCD) device, comprising:
a first substrate comprising a common electrode and a third conductive layer, the common electrode and the third conductive layer being co-planar, the common electrode being electrically isolated from the third conductive layer by a gap therebetween, and the third conductive layer and the common electrode being disposed alternately;
a second substrate opposite to the first substrate;
a liquid crystal layer disposed between the first substrate and the second substrate;
a first sensing line and a second sensing line disposed on a surface of the second substrate near the liquid crystal layer;
a first conductive layer and a second conductive layer electrically connected to the first sensing line and the second sensing line, respectively, the first conductive layer and the second conductive layer electrically isolated from each other by a gap existing therebetween; and
a spacer disposed on the first substrate and corresponding to the gap.

20. The in-cell touch-sensitive LCD device as claimed in claim 19, wherein the first sensing line is perpendicular to the second sensing line, the first sensing line serves as a scan line, the second substrate further comprises a thin film transistor (TFT) and a pixel electrode, a gate of the TFT is connected to the first sensing line, a source of the TFT is connected to the data line, and a drain of the TFT is conncted to the pixel electrode.

* * * * *